June 16, 1953     M. PURANEN ET AL     2,642,477

METHOD FOR INDUCTIVE PROSPECTING

Filed Aug. 11, 1948

INVENTORS
M. Puranen
A. A. Kahma

BY    *C. F. Wenderoth*

ATTORNEY

UNITED STATES PATENT OFFICE 2,642,477

METHOD FOR INDUCTIVE PROSPECTING

Maunu Puranen and Aarno Assar Kahma, Helsinki, Finland

Application August 11, 1948, Serial No. 43,783
In Finland September 8, 1947

10 Claims. (Cl. 175—182)

A transmitter and a receiver constitute the main parts in the inductive prospecting method. In the transmitter there is generated an alternating current, which is fed to e. g. the transmitting coil. The frequency employed is usually rather low, of the order of 0.5 to 100 kilocycles per second. The alternating current flowing in the transmitting coil creates an electromagnetic field, which spreads out into the surroundings. If the ground is "neutral," i. e. it contains neither ores nor other conductive geological formations, the magnetic field of the transmitting coil weakens with increasing distance according to the third power of distance. In general, the distance between the transmitting and the receiving point is namely a few hundred or thousand meters only, which is considerably less than the wave length corresponding to the used frequency. Further, in this zone near the transmitting coil the magnetic field generated by the coil is practically in the same phase as the current in the coil.

Accordingly, when neutral ground is in question the magnetic field of the transmitting coil, which field we in this case can call "normal field," weakens according to the third power of the distance and it is in the same phase as the current of the transmitting coil. In case the ground is not neutral but contains ores or other conductive geological formations (in the following, ores mean all conductive geological formations) the normal propagation of the magnetic field is disturbed in the vicinity of these conductive bodies owing to the eddy currents induced in the bodies. Consequently, the "actual field" measured in the vicinity of ores differs more or less from the "normal field" i. e. from the field which under corresponding conditions should be observed if no ores should be present. These differences between the actual field and normal field are called electrical anomalies caused by ores. When the measured actual field differs from the normal field regarding the amplitude or phase the corresponding anomalies are called amplitude anomaly and phase anomaly. Instead of amplitude and phase anomaly one can speak of real and imaginary components of the electrical anomaly, the first meaning that part of the electrical anomaly which is in the same phase with the normal field and the second that part which is in phase difference $\pi/2$ with the normal field.

The amplitude of the magnetic field due to the transmitting coil is determined at the receiving point by measuring the voltage induced in the receiving coil by said field. The amplitude of this voltage is proportional to the space component of the magnetic field which is perpendicular to the plane of the receiving coil, the difference between phases of the voltage and magnetic field being constant (about $\pi/2$). By turning the coil to three positions, each perpendicular to the others, one can measure the amplitudes and phases of all three space components of the magnetic field. Instead of all said components it is in practice sufficient to measure only one, for instance the vertical.

In the first place, the purpose of the inductive prospecting is to find anomaly regions in the area under investigation. The magnitudes of anomalies may be cleared up by determining the difference between the actual field and the normal field at observation points. Only the actual field can be directly measured at each point by the voltage induced in the receiving coil. The normal field may be determined by calculation when knowing the positions of the transmitting and receiving coils and the distance between them, and the current in the transmitting coil. Of course, the normal field may be determined also experimentally by making measurements under quite corresponding conditions but on neutral ground. In any case, one must accurately know the positions and distances of the coils and the current in the transmitting coil before the normal field and the voltage induced by it in the receiving coil may be determined. The simplest way of making measurements is to keep the positions and distances of the transmitting and receiving coils and the current in the transmitting coil accurately constant during the series of measurements, the normal field then keeping naturally a constant value too. If the observed actual field differs from this constant value of the normal field the differences are caused by conductive ores.

However, in practice it is not at all an easy task to keep all of the quantities mentioned above at constant value during a longer series of measurements. In order to eliminate the errors due to variations of current in the transmitting coil the so called compensation method is usually employed. In this case, there is measured not the absolute value of the voltage induced in the receiving coil but the relative value as compared to the so called compensation voltage, the amplitude of which is proportional to the current in the transmitting coil and which has the same phase or at least constant phase difference with the said current. In that way the errors due to variations of the current are eliminated. On the other hand the errors caused by the variations of positions and distances of the coils are not eliminated although the compensation method is used.

Our invention has for its object first to present a measuring method by means of which the amplitude and phase anomalies caused by ores may be determined so that the errors caused by changes in the distances and positions of the transmitting and receiving coils are automatically eliminated. Using inductive prospecting methods known until now it is necessary to keep the positions of said coils motionless at the moment of measurement. By means of our invention accurate measurements may be performed also in the case that the transmitting and receiving coils are in movement and their distances and positions in relation to each other are changing all the time when making measurements. The last mentioned matter is especially valuable when one intends to perform inductive prospecting from rapidly moving vehicles. Using the normal compensation method a connecting cable is necessary when bringing the compensation voltage from transmitting place to receiving place, while by means of our invention no connecting cable is needed. Further, our invention describes a method for the continuous and speedy recording of electrical anomalies. Rapid recording is necessary for performing electrical prospecting from moving vehicles. Our invention is very suitable to airborne electrical prospecting by using e. g. the airplane organization described in our Finnish Patent No. 23,428. The transmitting and receiving apparatus can always be arranged into two adjacent airplanes of a formation flying abreast in which case the distance between the coils is equal to that between the planes. In that way also deeply situated ores may be discovered because the depth attainable with the electrical apparatus is approximately the same as the distance between the transmitting and receiving coil.

With the above and other objects in view, the invention is shown in the drawing in which.

Figure 1:
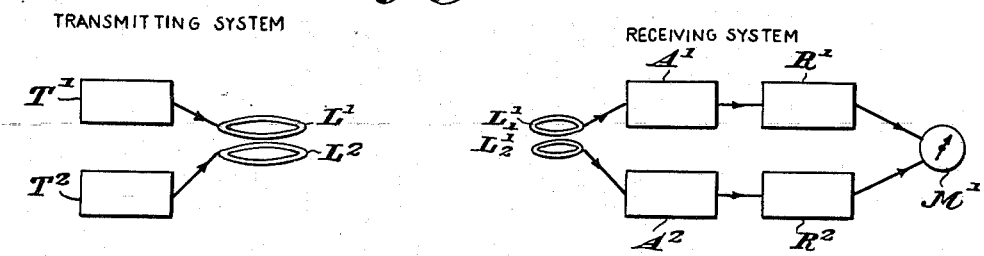
Fig. 1 illustrates schematically a method by which the amplitude anomalies may be measured.

In Fig. 1 there is presented schematically a method by means of which the amplitude anomalies may be measured so that errors due to changes in positions and distances of coils are eliminated. Transmitters $T_1$ and $T_2$ feed currents into the transmitting coils $L_1$ and $L_2$, the ratio between the amplitudes of said currents being kept constant. The coils $L_1$ and $L_2$ are as similar in form, concentric, and equipositioned as possible. As a special case, it can be thought that instead of two coils, $L_1$ and $L_2$, only one coil is used, to which currents are fed from transmitters $T_1$ and $T_2$ by means of suitable transformers. The frequency $f_1$ of the transmitter $T_1$ is some prospecting frequency normally employed, we shall call it "principal frequency" in the following, while the frequency $f_2$ used in the transmitter $T_2$ is markedly lower. On the receiving point, situating at a distance of a few tens or hundreds of meters from the transmitting point, the magnetic fields of the coils $L_1$ and $L_2$ induce alternating voltages in the receiving coils, $L'_1$ and $L'_2$, which coils are also as similar in form, concentric, and equipositioned with each other as possible. The voltages induced in the coils $L'_1$ and $L'_2$ are amplified linearly and selectively in the amplifiers $A_1$ and $A_2$, the first of which being tuned at the principal frequency $f_1$ and the second at the low frequency $f_2$. The voltages thus amplified are rectified and filtered in the rectifiers $R_1$ and $R_2$, the two direct voltages thus obtained being lead into a quotient meter, e. g., the reading of which shows the quotient of the said voltages. This quotient of the voltages shows also the quotient between the amplitudes of the principal and the low frequency magnetic field on the receiving point, which quotient in turn is proportional to the ratio between the amplitudes of the "actual" and the "normal" principal frequency field, as will be evident from the following.

The low frequency $f_2$ is selected so low that ores, possibly situated in the vicinity of the observation place, do not noticeably affect the propagation of the low frequency field from the transmitting point to the receiving point. The lower the frequency $f_2$ is selected the more negligible are the eddy currents created by the field in ores and the smaller the disturbances caused by ores in the low frequency field. Consequently, the low frequency magnetic field generated by the coil $L_2$ weakens quite regularly, like the normal field, according to the law of the third power of the distance, even though there were ores in the vicinity. Due to the similarity and concentricity of the coils mentioned above, the amplitude of the voltage induced in the coil $L'_2$ by the low frequency field is under all conditions proportional to the voltage which principal frequency normal field should arise in it, because the said two magnetic fields have the same direction and their amplitudes are proportional to each other at any point. On the other hand, the voltage generated in the coil $L'_1$ by the principal frequency field is naturally proportional to this principal frequency actual field. Accordingly, the reading of the quotient meter $M_1$ is a measure for the ratio between the actual and normal principal frequency field. This reading remains constant even though the distances and positions of coils are changing. If the reading changes, the change is an indication of conductive ore bodies located in the vicinity.

Figure 2:
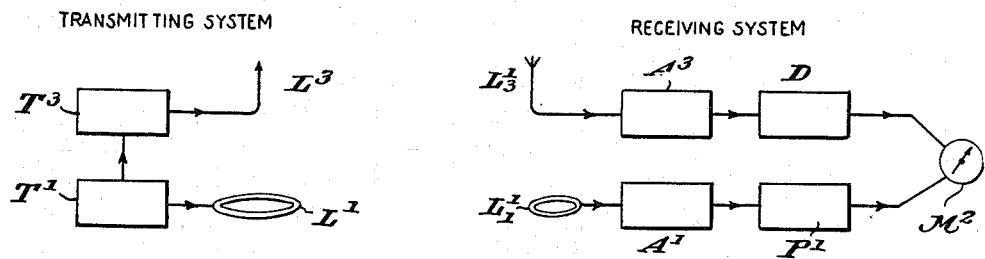
Fig. 2 shows schematically a method for measuring the phase anomalies of the principal frequency field.

Fig. 2 describes schematically a method for measuring the phase anomalies of the principal frequency field. The transmitter $T_1$ operating at principal frequency $f_1$ feeds current into the transmitting coil $L_1$ at the transmitting point. The transmitter $T_3$ with a markedly higher frequency $f_3$ (e. g. in radio high frequency band) feeds high frequency power into the antenna (or coil) $L_3$. The high frequency wave generated by the transmitter $T_3$ is modulated by a principal frequency current taken out from the transmitter $T_1$. Accordingly, a high frequency wave is radiating from the antenna $L_3$, that wave operating as a carrier for the principal frequency modulating wave. For example, the amplitude modulation may be used, but as well some other of the known methods of modulation. At the receiving point, $f_1$- and $f_3$-frequency fields induce in the coil $L'_1$ and antenna $L'_3$ alternating voltages, which are amplified with amplifiers $A_1$ and $A_3$ selectively tuned at the said frequencies. The amplified high frequency voltage is demodulated in the demodulator D, in which at the same time the phase of the voltage thus obtained is shifted until it is the same as the phase of the current in the transmitting coil $L_1$. It is necessary to perform this adjustment of the phase only one time, before beginning the ordinary measurements. In similar way, the phase of the voltage obtained from the amplifier $A_1$ is adjusted in the phase shifter $P_1$ until the voltage is in the same phase as the current in the transmitting coil $L_1$. The phase difference between the two principal frequency voltages brought out from the said devices, D and $P_1$, is measured by means of the phase difference meter $M_2$. Above neutral areas the reading of the meter $M_2$ remains constant in spite of changes in distances and positions of the coils. Though there are ores in the vicinity, they do not effect in any way the phase of the voltage transferred using the modulated high frequency, but ores affect a change in the phase of the principal frequency field propagating from the transmitting point to the receiving point, and thus also a change in the phase of the output voltage of the phase shifter $P_1$. Consequently, the phase difference meter $M_2$ shows the phase difference between the measured actual field and the normal field at the receiving point or in other words the magnitude of the phase anomaly.

Figure 3:
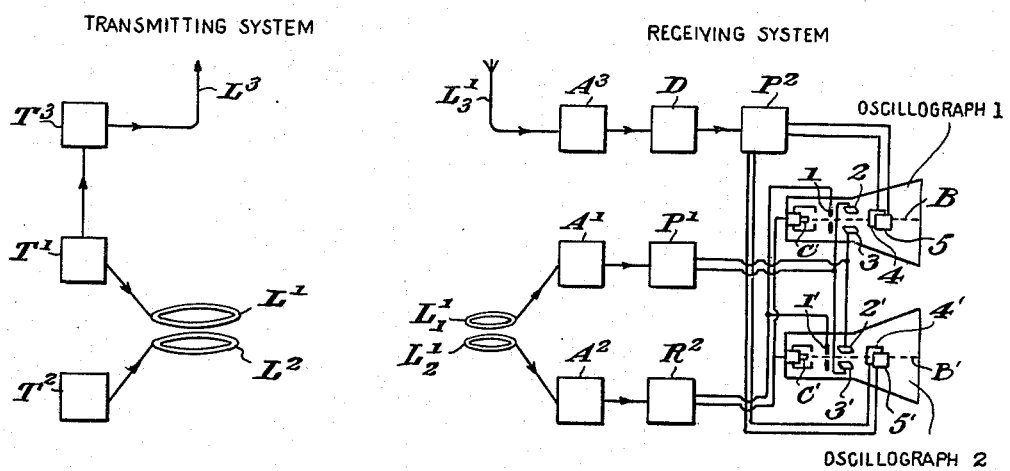
Fig. 3 shows schematically how the real and imaginary anomalies of the principal frequency field may be continuously measured and recorded.

Finally, Fig. 3 describes how the real and imaginary anomalies of the principal frequency field can be continuously measured and recorded by means of two cathode ray oscillographs, in such a way, that changes in distances and positions of coils cause no errors. The function of the devices described in Fig. 3 is about the same as that of corresponding devices in Figs. 1 and 2. The transmitters $T_1$, $T_2$, and $T_3$ feed one current with principal frequency $f_1$, one with markedly lower $f_2$, and one with markedly higher frequency $f_3$ than the principal frequency into the coils (or antennas) $L_1$, $L_2$, and $L_3$. The coils $L_1$ and $L_2$ are as similar in form, concentric and equipositioned as possible, and the ratio of the currents fed into them is kept constant. A principal frequency current obtained from the transmitter $T_1$ modulates the high frequency current generated by the transmitter $T_3$. At the receiving point, the $f_1$-, $f_2$-, and $f_3$-frequency fields generate alternating voltages in the coils (or antennas) $L'_1$, $L'_2$, and $L'_3$, which voltages are amplified linearly and selectively by the amplifiers $A_1$, $A_2$, and $A_3$. The low frequency $f_2$ output voltage of the amplifier $A_2$ is rectified and filtered by the rectifier $R_2$, and the obtained direct voltage acts as the acceleration voltage of the electron beams, B and B', of two cathode ray oscillographs. The said acceleration voltage is effected between the cathodes, C and C', and anodes, I and I'. The phase of the principal frequency $f_1$ output voltage of the amplifier $A_1$ is made by means of the phase shifter $P_1$ the same as the phase of the received principal frequency field, after which the obtained principal frequency voltage is effected on the deflecting $y$-plates, 2, 3 and 2', 3', of the oscillographs. The high frequency $f_3$ voltage from the amplifier $A_3$ is demodulated by means of the demodulator D, and the principal frequency voltage thus obtained is divided in the phase shifter $P_2$ in two parts, the first of which is in the same phase as the principal frequency field at the transmitting point (in other words, in the same phase as the current in the coil $L_1$), and the second of which is in the phase difference $\pi/2$ with respect to the said field. The first of the said two voltages is effected on the deflecting $x$-plates, 4 and 5, of the first oscillograph, and the second on the $x$-plates, 4' and 5', of the second oscillograph. When the oscillographs are in operation, on the screens of both oscillographs there are phase ellipses to be seen. It is not necessary to photograph the phase ellipses as a whole, but it is enough to determine continuously the intersections of the phase ellipses and e. g. the $y$-axes on the fluorescent screens of the two oscillographs. This may be performed, for instance, by covering the screen with non-transparent covers, leaving in the covers only narrow transparent slits at the places of the $y$-axes. If required, the positions of the said intersections of the phase ellipses may be thus continuously recorded by the known photographic methods. The cameras, then needed, are not illustrated in Fig. 3. It is easy to show by means of the well known equations for the operation of cathode ray oscillographs that using the measuring and recording method presented above the reading of the one oscillograph indicates the real anomalies and the reading of the other the imaginary anomalies of the principal frequency field. The said anomalies are obtained as relative values as compared with the principal frequency normal field. The cathode ray oscillographs namely function as quotient meters, because the acceleration voltages of the electron beams are made proportional to the principal frequency normal field effective at the receiving point.

It is clear that the devices and methods disclosed herein are susceptible of various modifications without departing from the spirit and principles of the invention. So the comparison of the amplitudes of two alternating voltages with each other may be done also otherwise as presented in the Fig. 1. The modulation of the high frequency field by means of the principal frequency current must not necessarily be sinusoidal, etc. Accordingly, it is desired to claim all novelty inherent in the invention as broadly as the prior art permits.

We claim:

1. A method for measuring the anomalies caused by ores, or other conductive geological formations, in a principal frequency electromagnetic field which comprises generating a principal frequency field, generating a field with markedly different frequency than the principal frequency, all said fields propagating from a transmitting point to a receiving point, modulating the amplitude of the different frequency field by means of the principal frequency field, the different frequency field thus being a carrier for a principal frequency signal, keeping the radio between the amplitudes of the principal frequency and the different frequency field constant at the transmitting point, the relationship between the two transmitted fields with respect to the relationship between the two received fields being maintained constant, the ratio between amplitudes of the different frequency and principal frequency field at the receiving point determining the amplitude anomaly of the principal frequency field, whereby owing to the frequency of the different frequency field and to the said constant relationship of transmitted fields the errors which would arise without these arrangements due to changes in relationship between said fields are automatically eliminated, and comparing the phase of the voltage induced by the principal frequency field with the phase of another principal frequency voltage which is obtained by demodulating the different frequency voltage generated by the different frequency field to obtain the phase anomaly of the principal frequency field.

2. A method for measuring the anomalies caused by ores, or other conductive bodies in the amplitude of a principal frequency electromagnetic field which comprises generating of the principal frequency field and generating separately a field with markedly lower frequency than the principal frequency from a transmitting point, the lower frequency being sufficiently low to render the separately generated field substantially free of observable anomalies caused by ores, keeping the ratio between the amplitudes of said fields constant at the transmitting point, receiving and measuring said fields at a receiving point, maintaining the position relationship between the transmitted fields constant with relation to the position relation of the received fields, amplifying selectively and linearly the two alternating voltages induced by said fields, obtaining the ratio of the amplitudes of said amplified voltages which ratio is a measure of the ratio of amplitudes of said two fields at the receiving point and also a measure for the amplitude anomaly, whereby owing to the very low frequency of the low frequency field and to the said position relationship of the transmitted and received fields the errors which should arise without these arrangements due to changes in distances and positions between said fields are automatically eliminated.

3. A method for measuring the anomalies caused by ores, or other conductive bodies in the phase of a principal frequency electromagnetic field which comprises generating the principal frequency field and generating separately a field with markedly higher frequency than the principal frequency from a transmitting point, modulating the amplitude of the high frequency field with the help of the principal frequency field, the high frequency field thus being a carrier for a principal frequency signal, receiving the fields at a receiving point, and obtaining the phase anomaly by measuring at the receiving point the phase difference between two principal frequency alternating voltages the one of which being induced by the principal frequency field and the other being obtained by demodulating the high frequency voltage generated by the high frequency field, both said voltages being selectively amplified before measurement.

4. A method for measuring and continuously recording the anomalies caused by ores, or other conductive bodies, in the real and imaginary components of a principal frequency electromagnetic field utilizing two cathode ray oscillographs which comprises generating the principal frequency field, generating a field with markedly lower frequency, and generating a field with markedly higher frequency than the principal frequency, all said fields propagating from a transmitting point to a receiving point, modulating the amplitude of the high frequency field with the help of the principal frequency field, the high frequency field thus being a carrier for a principal frequency signal, keeping the ratio between the amplitudes of the principal frequency and low frequency fields constant at the transmitting point, maintaining the generation of both fields similar in form, co-axial and equipositioned, maintaining at the receiving point the reception of the principal frequency and low frequency fields similar in form, co-axial and equipositioned as the transmitted fields, linearly amplifying and rectifying the voltage induced by the low frequency field and using direct voltage thus obtained as the acceleration voltage for electron beams of the two cathode ray oscillographs, linearly amplifying the voltage induced by the principal frequency field and shifting its phase until it is the same as the phase of principal frequency field received and using the voltage thus obtained as deflection voltage at $y$-plates of the two oscillographs, amplifying and demodulating the voltage generated by the high frequency field and dividing the principal frequency voltage thus obtained in two parts the first of which being in the same phase as and the second in phase difference $\pi/2$ with the principal frequency field at the transmitting point, using the first part as deflecting voltage at $x$-plates of the first one of the oscillographs and a second part as deflecting voltage of a second of the oscillographs, whereafter the real and imaginary anomalies of the principal frequency field are recorded by continuously photographing the intersections of the phase ellipses and the $y$-axes on the fluorescent screens of the oscillographs.

5. In the art of inductive prospecting of geological formations such as ores by generating and transmitting of an electromagnetic field from a transmitting point to a receiving point and observation of amplitude and phase anomalies caused in said field by the occurrence of ores the step of measuring said anomalies comprising the simultaneous generating and transmitting of three different frequency fields, consisting in a main prospecting field in which the said anomalies are caused, an auxiliary field of considerably higher frequency and another auxiliary field of considerably lower frequency, modulating of the high frequency field by means of the main frequency field so that it becomes a carrier of a signal wave having a phase which remains constant independently of occurring ores, comparing this phase with the phase of the main prospecting field at the receiving point, the difference between them indicating the phase anomaly occurred in the latter, maintaining the ratio between the amplitudes of the main prospecting field and the low frequency field constant at the transmitting point, maintaining the frequency of the low frequency field so low that ores do not cause any observable anomalies in the amplitude of this field during its propagating towards the receiving point, comparing the amplitude of the low frequency field with the amplitude of the main prospecting field at the receiving point, the change in the ratio of said amplitudes being the amplitude anomaly of main prospecting field.

6. In the art of inductive prospecting according to claim 5 and simultaneously generating and wireless transmitting an auxiliary high frequency field, modulating of this field by means of the main field, whereby the high frequency field becomes a carrier of a modulated signal wave with a phase which remains constant independently of occurring ores, comparing of this phase with the phase of the main prospecting field at the receiving point whereby the difference appearing indicates the phase anomaly of the main prospecting field.

7. In the art of inductive prospecting according to claim 5 and simultaneously generating and wireless transmitting an auxiliary magnetic field of considerably lower frequency similar in form, co-axial and equipositioned relative to the main field, maintaining the ratio between the amplitudes of the main frequency field and the low frequency field constant at the transmitting point, and receiving both said fields at a receiving point, co-axial and equipositioned, thereby avoiding errors which would otherwise arise due to changes in distance and position between transmitted and received fields, and comparing the amplitudes of both fields at the receiving point, the change in the ratio of said amplitudes indicating amplitude anomaly caused by ores in the main prospecting field.

8. An apparatus for inductive prospecting of geological formations such as ores comprising a transmitter unit for generating and wireless transmitting of electromagnetic fields and a receiver unit for receiving these fields, the transmitter unit having a first coil for generating and transmitting a main prospecting field, a second coil for simultaneous generating and transmitting of a low frequency field, said second coil being similar in form, co-axial and equipositioned relative to the first mentioned coil, the transmitter unit being adapted to keep the ratio beween the amplitudes of the main prospecting field and the low frequency field constant at the transmitting point, and a third coil for transmitting a high frequency auxiliary field, means for modulating said auxiliary field by means of the main field to become a carrier of a signal wave with a phase which remains constant independently of occurring ores, the receiver unit having correspondingly arranged coils for receiving the said three fields, the coil arrangements being adapted to eliminate errors which otherwise would arise by changes in distance and position between the transmitter and receiver coils, indicating means for said receiver for indicating the change in amplitude ratio between the received main prospecting field and the low frequency field, said change appearing as amplitude anomaly of the main field and means for indicating the difference in phase between the main field and the modulated signal wave carried by the high frequency field, this difference appearing as phase anomaly in the main field.

9. In apparatus for measuring of phase anomalies caused by ores in the prospecting field comprising a transmitter and a receiver unit, the transmitting unit having a coil for generating and transmitting of the main prospecting field and another device for simultaneous generating and transmitting of a high frequency field so arranged that the high frequency field is modulated by the main prospecting field to become a carrier of a signal wave with a phase which remains constant independently of occurring ores, the receiver unit having corresponding devices for receiving of said both fields, a device for demodulating the high frequency field, and a meter for indicating the phase difference between the signal wave and the main prospecting field at the receiving point, which difference represents the phase anomaly of the main prospecting field caused by the occurrence of ores.

10. In apparatus for measuring of amplitude anomalies caused by ores in a transmitted prospecting field comprising a transmitting and a receiving unit, the transmitting unit having two similar formed, co-axial and equipositioned coils, the first one adapted to transmit the main prospecting electromagnetic fields and the second one adapted to simultaneously transmit an auxiliary field with considerably lower frequency, the transmitting unit further being adapted to keep the ratio between the amplitudes of the main field and the low frequency field constant at the transmitting point, the receiving unit having correspondingly two similar formed, co-axial and equipositioned receiving coils and a meter, the first coil being adapted to receive the main prospecting field in which occurring ores cause amplitude changes, and the second one adapted to receive the low frequency field, the frequency of which is chosen so low that the occurrence of ores does not cause any amplitude changes in it, the meter being adapted to indicate the changes in the ratio between the received two amplitudes, which changes represent the amplitude anomaly in the main prospecting field.

MAUNU PURANEN.
AARNO ASSAR KAHMA.

References Cited in the file of this patent

UNITED STATES PATENTS

| Number | Name | Date |
|---|---|---|
| 1,045,575 | Lowy | Nov. 26, 1912 |
| 1,818,331 | Jakosky | Aug. 11, 1931 |
| 2,139,460 | Potapenko | Dec. 6, 1938 |
| 2,242,312 | Machts | May 20, 1941 |
| 2,426,918 | Barret | Sept. 2, 1947 |